June 11, 1946.  R. J. FISHER ET AL  2,401,921
END FITTING FOR FLEXIBLE HOSES
Filed Nov. 10, 1943
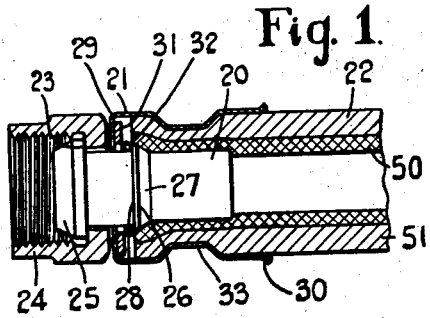
Fig. 1.
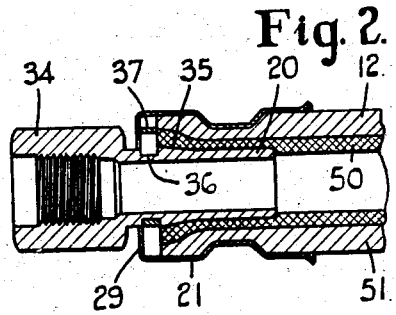
Fig. 2.
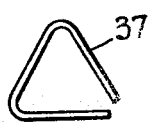
Fig. 3.
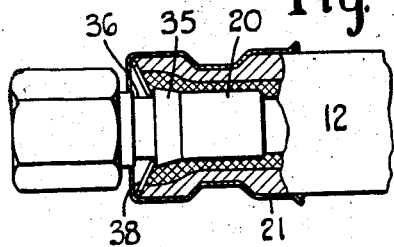
Fig. 4.
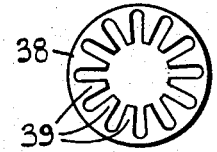
Fig. 5.
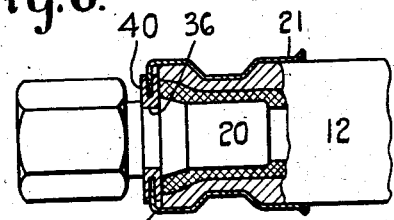
Fig. 6.
Fig. 7.
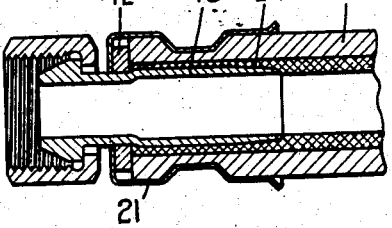
Fig. 9.
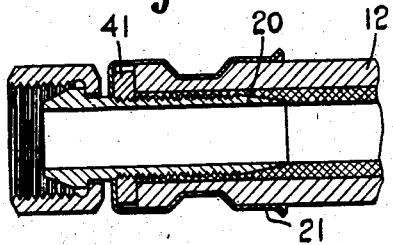
Fig. 8.
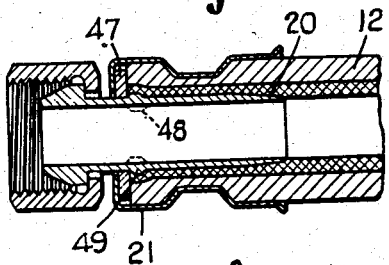
Fig. 11.
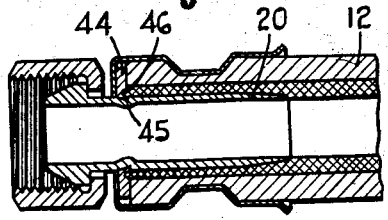
Fig. 10.
Inventors
Reginald John Fisher
William Hudson James Brock
by Stevens and Davis
their attorneys Patented June 11, 1946

2,401,921

UNITED STATES PATENT OFFICE 2,401,921

END FITTING FOR FLEXIBLE HOSES

Reginald John Fisher and William Hudson James Brock, Leamington Spa, England, assignors to Automotive Products Company Limited, Leamington Spa, England Application November 10, 1943, Serial No. 509,784 In Great Britain November 26, 1942

9 Claims. (Cl. 285—84)

This invention relates to end fittings for flexible hoses, of the kind in which the end of the hose is gripped between a tubular nipple or insert (hereinafter referred to as the nipple) pushed into the hose, and a circumferentially continuous sleeve surrounding the end of the hose, the nipple projecting from the end of the hose and beyond the outer end of the sleeve and being screwed or otherwise formed for attachment to an appropriate connection.

The object of the invention is to provide an improved end fitting of the kind referred to, which is of simple construction but is able to stand very high pressures without being pulled off the hose.

According to the invention the sleeve is formed at its outer end with an internal flange adapted to pass over the nipple from the end thereof which enters the hose, and to be engaged by a stop formed or positioned on the nipple after the sleeve has been mounted thereon, to retain the sleeve on the nipple.

According to one form of the invention, the end fitting comprises a nipple having a change of diameter intermediate its ends to form a circumferential step facing the outer end of the nipple, a sleeve having an internal flange at its outer end adapted to pass over the step, and stop means surrounding the nipple and adapted to be positioned between the flange and the step after the sleeve is in position on the nipple, the stop means being caused to engage the step by contraction of its internal dimension after it has passed over the step.

The stop means may comprise a resilient element, the initial internal dimension of which is such that it will not pass over the step, the stop means being expanded to pass over the step and resuming its initial dimension after it has passed thereover.

The stop means may, alternatively, comprise an internally screwed collar engaging a screw thread on the nipple, or may comprise a substantially rigid annular washer adapted to pass freely over the nipple and to be permanently deformed whilst in position thereon to reduce its internal diameter and cause it to engage a shoulder, groove or the like on the nipple. As another alternative, the stop may be formed by radial expansion of a part of the nipple within the sleeve after the latter has been assembled on the nipple.

The hose may be clamped between the sleeve and nipple by rolling, pressing or otherwise forming one or more circumferential depressions around the sleeve.

The invention is hereinafter described with reference to the accompanying drawing, in which:

Figure 1 is a longitudinal section through the end portion of a flexible hose to which is attached a hose end fitting according to the invention;

Figure 2 is a similar view showing another form of end fitting according to the invention;

Figure 3 is an elevation of a resilient stop member employed in the form of end fitting shown in Figure 2;

Figure 4 is another view similar to Figure 1 showing a further form of hose end fitting according to the invention;

Figure 5 shows the form of resilient stop member employed in the form of end fitting shown in Figure 4;

Figure 6 is another view similar to Figure 1 showing another form of end fitting according to the invention;

Figure 7 is a view showing the form of stop member employed in the end fitting shown in Figure 6; and Figures 8 to 11 are further views similar to Figure 1 showing other alternative forms of end fitting according to the invention.

Referring to Figure 1, the end fitting comprises a nipple 20 and a sleeve 21 between which the end of the hose 22 is gripped by swaging inwardly an intermediate portion of the length of the sleeve 21, to compress the hose between the sleeve and the nipple. The nipple is formed at its outer end with a flange 23 to serve as an abutment for a nut 24 by means of which the end fitting is coupled to an appropriate adaptor or boss, the flange having a coned face 25 to engage a corresponding face on the adaptor or boss and form a fluid-tight seal between the nipple and adaptor or boss. Between the ends of the nipple is formed a circumferential collar 26 having a sloping face 27 on the side nearer the end of the nipple which enters the hose, and having its other side face 28 perpendicular to the axis of the nipple. The part of the nipple between the collar 26 and the flange 23 is of greater external diameter than the part which enters the hose. The sleeve 21 has an inturned flange 29 at one end, and is slightly flared at the other end, as at 30, to avoid having a sharp corner which might damage the hose. The flange 29 surrounds an aperture large enough to pass freely over the collar 26, and between the flange and the collar, where the hose end fitting is assembled, are arranged a substantially rigid washer 31 and a split spring wire ring 32, the latter being of an initial size such that it will not pass over the collar 26 without being expanded, whilst the washer 31 will pass over the collar but not over the spring wire ring. The spring wire ring 32 thus forms a stop to prevent the withdrawal of the sleeve 21 from the nipple 20.

The end fitting is assembled in the following manner. The nut is first mounted on the nipple, the aperture in the nut being large enough to pass freely over the collar 26. The nipple 20 is then inserted in the sleeve 21 until the flange 29 engages the nut 24, the washer 31 is passed over the collar 26 so that it rests against the flange 29, and the spring wire ring 32 is then pushed over the collar 26, the ring expanding as it rides up the inclined face 27 of the collar and snapping into place between the washer 31 and the perpendicular face 28 of the collar. The end of the hose is then inserted between the nipple and the sleeve, and an annular depression 33 is formed in the sleeve by rolling, pressing or any other convenient operation, to grip the hose end between the sleeve and nipple. Before this is done, the sleeve is so positioned that the ring 32 is firmly up against the face 28, the washer 31 against the ring 32, and the flange 29 against the washer, so that the sleeve 21 cannot move towards the inner end of the nipple. It is thus impossible for the nipple to be forced out of the hose unless, at the same time, the sleeve is pulled off the outer surface, and the end fitting will therefore withstand a much greater pressure than it would if the nipple could move independently of the sleeve.

Figure 2 shows a modified form of end fitting in which the nipple 20 has an enlarged outer end 34 screw-threaded internally to engage an appropriate screwed adaptor. The nipple has a tapered portion 35 between its smaller inner end and a thicker intermediate part, a groove 36 of rectangular cross-section being formed in the intermediate part immediately adjacent the larger end of the tapered portion. The stop member comprises a strip of resilient metal 37 bent into a triangular form as shown in Figure 3, and so dimensioned that when pushed on to the nipple it springs into the groove 36, the corners projecting radially and engaging with the flange 29 of the sleeve 21.

The assembly of this form of end fitting is carried out by first inserting the nipple into the sleeve, and then pushing the stop member 37 up the tapered portion of the nipple into the groove 36, the hose being then inserted and secured as before.

The form of end fitting shown in Figure 4 has a nipple 20 similar to that shown in Figure 2, with a groove 36 of rectangular cross-section at the larger end of the tapered portion 35. The stop member in this case is a washer 38, shown also in Figure 5, having a continuous outer rim from which project inwardly a plurality of resilient radial fingers 39, the inner ends of which lie, when the washer is flat, in a circle at least as small as the base of the groove 36. When the washer is pushed along the nipple 20 after the latter has been inserted in the sleeve, the fingers 39 are deflected to enlarge the central aperture of the washer, and they spring into the groove 36 when the washer comes into register therewith, thus holding the sleeve in position on the nipple.

In Figure 6, the stop member which holds the sleeve in position on the nipple is a split resilient ring 40 of U-shaped cross-section, the arms of the U projecting radially outwardly and embracing between them the flange 29 of the sleeve 21. The ring 40 drops into a groove 36 in the nipple 20 as in the examples shown in Figures 2 and 4. Figure 7 shows the stop member 40.

The four forms of end fitting shown in Figures 8 to 11 have stop members which are not designed to spring into position behind a pre-formed shoulder on the nipple. Thus, in Figure 8, the stop is an internally threaded ring 41, and the nipple 20 is threaded externally from its inner end 20 so that the ring 41 can be screwed on to it after the nipple has been inserted in the sleeve 21.

In the arrangement shown in Figure 9 the nipple 20 is initially of uniform bore and thickness except that it tapers slightly on its outer surface at the inner end. A plain ring or washer 42 is held in place by expanding the inner end of the nipple at 43 to form a stop, the nipple being expanded by means of a suitable punch, after the sleeve 21 and washer 42 have been placed thereon.

In the arrangement shown in Figure 10, also, the nipple 20 is of uniform bore and thickness for the greater part of its length. The stop member 44 is initially a plain annular washer, and is permanently deformed when assembled in the required position on the nipple, to decrease its internal diameter and so cause it to form and enter a circumferential groove 45 in the nipple. The deformation may be effected by an annular punch having a V edge to form a groove 46 around the washer 44 close to its inner edge, thus forcing the inner edge to move radially inwardly.

Figure 11 shows another arrangement in which a washer 47 is positioned by a shoulder produced by deformation of the nipple. The nipple is formed initially with an annular rib 48, shown dotted in the drawing, extending around the bore. After the sleeve 21 and washer 47 have been positioned on the nipple a punch is driven through the latter to expand the rib 48 and form a corresponding rib 49 on the exterior of the nipple, where it is engaged by the washer 47.

The hose shown on the drawing is of the kind having an inner layer or core 50 of rubber upon which is formed a reinforcement 51 of braided textile threads. It is to be understood that other types of hose, such as that in which a reinforcement of braided or wrapped threads or wires is disposed between a core and an outer rubber layer, may equally well be provided with end fittings according to the invention. The attachment means on the nipple, shown as a flange 25 to receive a nut 24 in Figure 1, and as an internally threaded head in Figure 2, may take any other form appropriate to the fitting to which the hose is to be connected.

What we claim is:

1. A hose end fitting comprising a tubular nipple having an inner end adapted to be inserted in the hose and an enlarged outer end portion projecting from the end of the hose, a one piece circumferentially-continuous sleeve into which the nipple is adapted to be inserted substantially up to its enlarged end, said sleeve being adapted for inward swaging about a circumferential region to grip the hose between itself and the nipple, an inturned flange on the outer end of the sleeve defining an aperture too small to pass over the enlarged end of the nipple, and stop means to prevent subsequent withdrawal of the nipple from the sleeve, said stop means being adapted for introduction into the path of the flange after the nipple has been inserted in the sleeve.

2. A hose end fitting comprising a tubular nipple having an inner end adapted to be inserted in the hose, and an enlarged outer end portion projecting from the end of the hose, a one piece circumferentially-continuous sleeve into which the nipple is adapted to be inserted substantially up to its enlarged end, said sleeve being adapted for inward swaging about a circumferential region to grip the hose between itself and the nipple, an inturned flange on the outer end of the sleeve defining an aperture too small to pass over the enlarged end of the nipple, a shoulder on said nipple formed by a change in diameter of the said nipple and facing the outer end thereof, and stop means adapted to pass over said shoulder from the inner end of the nipple, and to be engaged with said shoulder by subsequent contraction of is internal dimension, whereby it is retained thereagainst to prevent subsequent withdrawal of the nipple from the sleeve.

3. A hose end fitting comprising a tubular nipple having an inner end adapted to be inserted in the hose and an enlarged outer end portion projecting from the end of the hose, a one piece circumferentially-continuous sleeve into which the nipple is adapted to be inserted substantially up to its enlarged end, said sleeve being adapted for inward swaging about a circumferential region to grip the hose between itself and the nipple, an inturned flange on the outer end of the sleeve defining an aperture too small to pass over the enlarged end of the nipple, a shoulder on said nipple formed by a change in diameter of the said nipple and facing the outer end thereof, and resilient stop means comprising a member adapted to surround the nipple and having an internal dimension smaller than the outer diameter of the shoulder, said resilient stop means being adapted to expand to pass over said shoulder and contract after having passed over so as to be retained there-against.

4. A hose end fitting comprising a tubular nipple having an inner end adapted to be inserted in the hose and an enlarged outer end portion projecting from the end of the hose, a one piece circumferentially-continuous sleeve into which the nipple is adapted to be inserted substantially up to its enlarged end, said sleeve being adapted for inward swaging about a circumferential region to grip the hose between itself and the nipple, an inturned flange on the outer end of the sleeve defining an aperture too small to pass over the enlarged end of the nipple, a shoulder on said nipple formed by a change in diameter of the said nipple and facing the outer end thereof, stop means adapted to pass over said shoulder from the inner end of the nipple and to be engaged with said shoulder by subsequent contraction of its internal dimension whereby it is retained there-against to prevent subsequent withdrawal of the nipple from the sleeve, and a rigid annular washer located between the stop means and the flange.

5. A hose end fitting comprising a tubular nipple having an inner end adapted to be inserted in the hose and an enlarged outer end portion projecting from the end of the hose, a one piece circumferentially-continuous sleeve into which the nipple is adapted to be inserted substantially up to its enlarged end, said sleeve being adapted for inward swaging about a circumferential region to grip the hose between itself and the nipple, an inturned flange on the outer end of the sleeve defining an aperture too small to pass over the enlarged end of the nipple, and stop means to prevent subsequent withdrawal of the nipple from the sleeve, said stop means comprising a substantially non-resilient annular washer having initially an internal diameter such that it passes freely over the nipple, the washer being permanently deformed while in position on the nipple to reduce its internal diameter so that the washer is interlocked with the nipple.

6. A hose end fitting comprising a tubular nipple having an inner end adapted to be inserted in the hose end and an enlarged outer end portion projecting from the end of the hose, a one piece circumferentially-continuous sleeve into which the nipple is adapted to be inserted substantially up to its enlarged end, said sleeve being adapted for inward swaging about a circumferential region to grip the hose between itself and the nipple, an inturned flange on the outer end of the sleeve defining an aperture too small to pass over the enlarged end of the nipple, and stop means to prevent subsequent withdrawal of the nipple from the sleeve, said stop means comprising a substantially non-resilient annular washer having initially an internal diameter such that it passes freely over the nipple, the washer being permanently deformed while in position on the nipple by punching an annular groove adjacent its inner edge, and thereby forcing the said inner edge radially inwardly, the deformed edge itself forming and entering a circumferential groove in the nipple.

7. A hose end fitting comprising a tubular nipple having an inner end adapted to be inserted in the hose end and an enlarged outer end portion projecting from the end of the hose, a one piece circumferentially-continuous sleeve into which the nipple is adapted to be inserted substantially up to its enlarged end, said sleeve being adapted for inward waging about a circumferential region to grip the hose between itself and the nipple, an inturned flange on the outer end of the sleeve defining an aperture too small to pass over the enlarged end of the nipple, and stop means comprising a radially expanded part of the nipple produced after the nipple has been inserted in the sleeve to prevent subsequent withdrawal of the nipple from the sleeve.

8. A hose end fitting comprising a tubular nipple having an inner end adapted to be inserted in the hose and an enlarged outer end portion projecting from the end of the hose, a one piece circumferentially-continuous sleeve into which the nipple is adapted to be inserted substantially up to its enlarged end, said sleeve being adapted for inward swaging about a circumferential region to grip the hose between itself and the nipple, an inturned flange on the outer end of the sleeve defining an aperture too small to pass over the enlarged end of the nipple, stop means comprising a radially expanded part of the nipple produced after the nipple has been inserted in the sleeve, and a rigid annular washer located between the flange and the stop means.

9. A hose end fitting comprising a tubular nipple having an inner end of substantially uniform thickness adapted to be inserted in the hose and an enlarged outer end portion projecting from the end of the hose, a one piece circumferentially-continuous sleeve into which the nipple is adapted to be inserted substantially up to its enlarged end, said sleeve being adapted for inward swaging about a circumferential region to grip the hose between itself and the nipple, an inturned flange on the outer end of the sleeve defining an aperture too small to pass over the enlarged end of the nipple, and stop means to prevent subsequent withdrawal of the nipple from the sleeve, said stop means comprising a shoulder on the nipple formed by expanding the nipple from its inner end up to the flange of the sleeve.

REGINALD JOHN FISHER.
WILLIAM HUDSON JAMES BROCK.

Certificate of Correction

Patent No. 2,401,921. June 11, 1946.

REGINALD JOHN FISHER ET AL.

It is hereby certified that errors appear in the printed specification of the above numbered patent requiring correction as follows: Column 5, line 7, claim 2, for "is internal" read *its internal*; column 6, line 30, claim 7, for "waging" read *svaging*; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.*